Dec. 13, 1938.  W. BAECKLER  2,139,657
IRRADIATING PROCESS AND APPARATUS
Filed March 31, 1934   2 Sheets-Sheet 1

INVENTOR.
WALTER BAECKLER
BY
*F. L. Greenewald*
ATTORNEY.

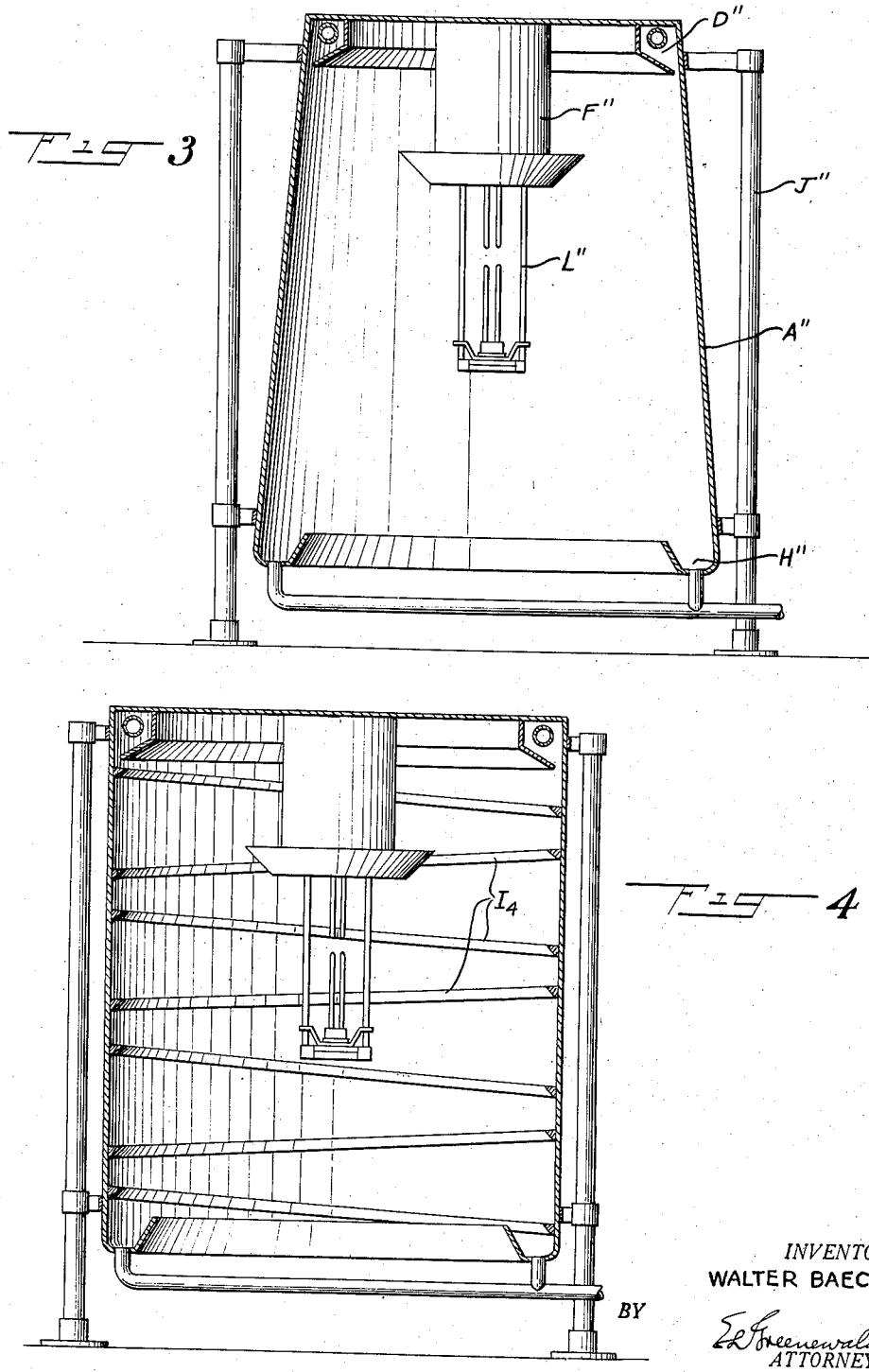

Patented Dec. 13, 1938

2,139,657

UNITED STATES PATENT OFFICE 2,139,657

IRRADIATING PROCESS AND APPARATUS

Walter Baeckler, Lakewood, Ohio, assignor, by mesne assignments, to Union Carbide and Carbon Corporation, a corporation of New York Application March 31, 1934, Serial No. 718,403

7 Claims. (Cl. 99—218)

This invention relates to means and process for irradiating substances with radiant energy in order to modify the properties thereof or to produce new properties therein. Although it is especially adapted for use in the irradiation of liquids it may also be used with relatively slight modifications for the irradiation of solids in finely divided form. Various types of radiant energy may be used, but the invention will be particularly described in connection with the irradiation of liquids with ultra-violet energy. The use of ultra-violet energy for the irradiation of food and other products is of constantly increasing commercial importance and I have devised a novel form of apparatus for carrying out this purpose in which means are provided for the regulation and retardation of the speed of travel and length of exposure of the material passing through the irradiating apparatus.

An object of the invention is to devise an apparatus so arranged as to give the material, whether in liquid or granular form, as nearly as possible a constant speed or progress in passing from one end of the enclosure to the other and at the same time causing the material to turn over or revolve on itself in a more or less turbulent flow to the end that all particles of the material being irradiated will be exposed equally to the source of radiant energy.

Another object of my invention is to produce a type of apparatus for use in the irradiation of liquids which will irradiate a maximum amount of liquids in a given time without causing the liquid to splash.

A further object of my invention is to produce a simple and inexpensive type of apparatus which will be rugged, durable and easy of operation and maintenance.

Other objects of the invention will in part be obvious and will in part appear hereinafter.

The invention accordingly comprises apparatus embodying features of construction, combinations of elements, and arrangements of parts which are adapted to effect such steps all as exemplified in the following detailed disclosure, the scope of the application of which will be indicated in the claims.

For a fuller understanding of the nature and objects of the invention reference should be had to the following detailed description taken in connection with the accompanying drawings in which:

Figure 3 is a similar view showing an apparatus illustrating a third embodiment of my invention; and Figure 4 is a central vertical section of still another modification.

In irradiating fluids such as milk it is customary to pass the milk in a thin film over a surface and expose the liquid to ultra-violet energy while on such surface. By this irradiation certain well-known beneficial effects are produced and the securing of different effects may require certain modifications in the arrangement of the surface over which the liquid flows and its position with respect to the source of radiation. Accordingly various types of irradiation devices are required to give the irradiation which is considered most efficient under varying circumstances. The forms of apparatus disclosed herein are especially designed to give an approximately uniform rate of flow over the surface upon which the liqud being irradiated flows.

Figure 1:
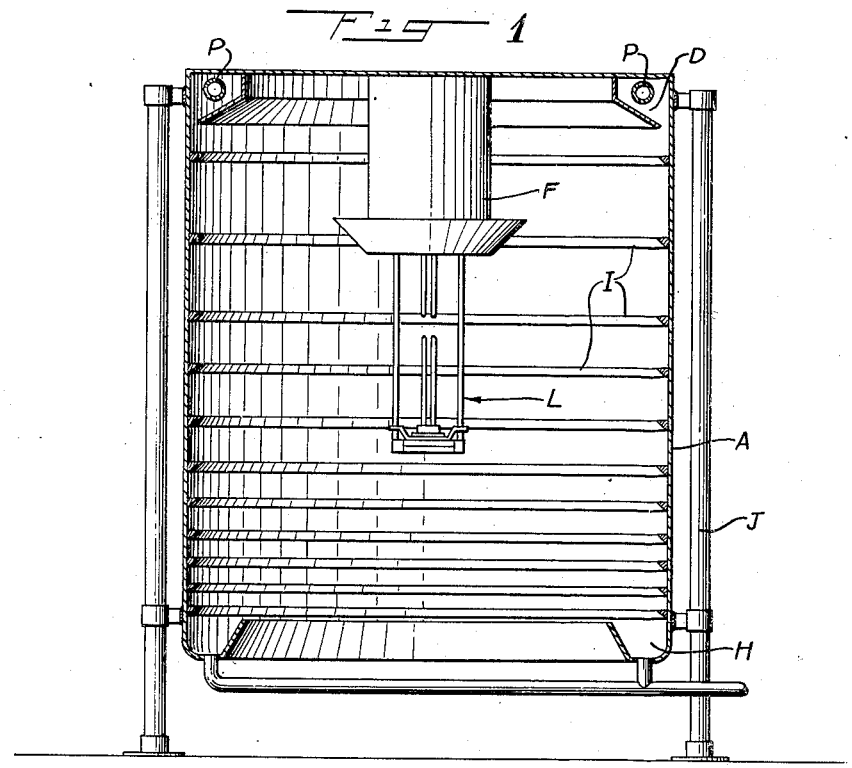
Figure 1 is a central vertical section showing the construction of apparatus illustrating one embodiment of my invention.

In Figure 1, I show one modification of a device for irradiating liquids with radiant energy. In this figure the source of energy L is represented as a carbon arc lamp, which has been found to be a very efficient source of ultra-violet energy. However, other sources of ultra-violet energy or sources of other types of radiant energy may be employed. Surrounding the energy source L is a stationary casing A which is supported by any suitable means, such as the supports J. The casing A is preferably cylindrical and may be divided to permit of cleaning and of access to the source of radiant energy. The interior of the casing A forms the surface over which the liquid being irradiated flows. The liquid being irradiated is supplied through a pipe P to a distributing means D forming an entrance. This distributor should be so arranged as to give a substantially uniform distribution of the liquid at the top of the casing A along its interior circumference. The liquid flows downward along the interior of the casing A and during its flow successively encounters a series of circumferential baffles I, which will be described more in detail below, and is collected by a suitable collecting means H at the bottom of the casing serving as an exit. The source of energy L is supported by any suitable means F, which may be provided with a duct or other means for removing fumes or gaseous products formed during the production of radiant energy.

The baffles I serve two purposes, they tend to retard the flow of liquid along the interior of the casing A and they also impart a tumbling or rotary motion to the particles of the liquid being irradiated. The baffles may be formed in any suitable manner as by bending the casing A, but I have found it quite satisfactory to attach them to the interior of this casing. While I have shown baffles having a cross section of a shape which I have found to be very satisfactory, it is obvious that other shapes may be employed as it is found most expedient to secure the desired irradiation effects or as is most convenient in reducing the cost of construction of the device. In selecting a shape for the baffle cross section care should be taken to use one which permits of ease in cleaning. While the baffles I use might be equally spaced, yet I prefer to have them spaced as shown in Figure 1, in which successive baffles toward the bottom of the casing are placed closer together. This is for the reason that as the liquid flows downwardly by gravity its speed tends to increase and accordingly baffles are required to be closer together toward the bottom to maintain the speed and film thickness nearly uniform. While this would not be necessary if the liquid were brought to a complete stop at each baffle, this is not the case and there is a slight increase in the speed at which the liquid flows downwardly along the interior of the casing A. It is to minimize this increase in the speed of flow that the baffles are arranged closer together as the bottom of the casing is approached, as is clearly shown in Figure 1.

Figure 2:
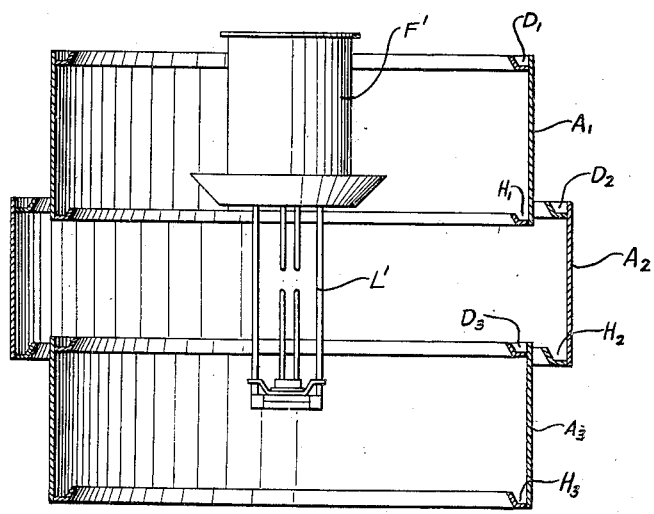
Figure 2 is a similar view showing a modified form of apparatus.

In Figure 2 is shown a modification in which the liquid comes to a complete stop at various portions of its travel. In this figure there is a source of energy $L'$ supported in any suitable manner as by $F'$, and a plurality of casing sections $A_1$, $A_2$, and $A_3$ surround the source of energy $L'$. Because the radiation emanating from the source of energy $L'$ falls more directly on the interior surface of the casing $A_2$, because the radiation is not uniformly distributed in points in a vertical plane passing through the source of energy, and because points on the surface $A_2$ would be closer to the source of energy than corresponding points in the surfaces $A_1$ and $A_3$ if the diameters were equal, provision may be made whereby the effect of the radiant energy on the surface will be equalized. This may be done by making the diameter of the casing $A_2$ greater than that of the other casings or by making the vertical dimension smaller or by a combination of these two means. Where the same liquid flows along the interior of all three casings this is not so important, but in certain cases it may be desired to divide the liquid and let separate portions thereof flow along the interior surfaces of the separate casings $A_1$, $A_2$, and $A_3$. In such cases it is desirable that the separate portions of the liquid be uniformly affected by the radiant energy. The liquid is supplied to the interior surfaces by distributing means $D_1$, $D_2$, and $D_3$ and is collected by suitable means $H_1$, $H_2$, and $H_3$. Where the same liquid is to flow over all three surfaces suitable means (not shown) are provided for transferring the liquid from $H_1$ to $D_2$ and from $H_2$ to $D_3$. On the other hand the liquid may be divided and separate portions supplied to $D_1$, $D_2$, and $D_3$ and these portions after being irradiated are collected at $H_1$, $H_2$, and $H_3$ and would conveniently be commingled. This would be done by suitable conduits which form no part of my invention and are not shown in detail.

By the diversion of the liquid to three places on the interior of the casing I am enabled in many cases to attain an increased efficiency over the method in which the liquid is passed over the entire surface in a film or layer three times as thick. This is because the surfaces are so spaced and proportioned as to utilize the maximum momentary absorption effect, which seems to be highest during the first stages of an exposure to radiant energy.

In Figure 3 I show another embodiment of my invention. As in the preceding embodiments a stationary surface $A''$, supported by a suitable standard $J''$, surrounds a source of energy $L''$ which is supported by any convenient means $F''$. The liquid to be irradiated is supplied at $D''$ and is collected at $H''$. The casing $A''$ whose interior surface serves as a support for the film to be irradiated is arranged in the form of the frustrum of a cone with its larger diameter at the bottom. The purpose of the provision of the conical type of support is to maintain the rate of flow of the liquid being irradiated more nearly constant. During the travel of the liquid down the interior of the casing the film tends to spread out and become thinner as a result of an increased speed over the surface. By increasing the diameter of the casing there is a still further decrease in the thickness of the film of liquid. However with a marked decrease of the thickness of the film there is a sharp reduction in the speed of flow of the film over the supporting surface. This may be due to the fact that a larger proportion of the film is in frictional engagement with the supporting surface. That is to say, an increase in the speed of travel of the film tends to decrease the thickness of the film if the liquid is supplied at a constant rate; yet a decrease in the thickness of the film tends to decrease the speed of travel, but to a lesser extent. Thus a uniform speed will not be reached in vertical flow in the distance required for commercial irradiation. With a conical surface the speed becomes more nearly constant. This may be due to the fact that the distance traveled is greater than its vertical component; it may be due to the fact that the decrease in thickness is greater than that caused by the increased speed of travel. Whatever the cause may be, I have found that by utilizing a conical surface, a decrease in the speed of flow results. Also there is a movement with the film due to the spreading thereof which gives a turbulent effect resulting from the lateral movement of the particles to cover the increased surface, which thus exposed all particles to the irradiating energy.

I am aware that it has been proposed to irradiate films of liquids on the interior surface of a cone. However, this has been done by rotating the cone so that the liquid is held thereagainst by centrifugal force. It has not been realized heretofore that by making the angle to the vertex of a stationary cone very small it is possible to maintain a film of liquid on the interior surface solely by surface tension.

In Figure 4 I show a modified form of device which is similar, in many respects, to that shown in Fig. 1. However, the baffles $I_4$ are inclined downwardly and the downward inclination is in opposite directions in adjacent baffles. This arrangement has the double advantage of rotating the particles of the material being irradiated about horizontal axis while passing down the interior surface of the casing and about axis other than horizontal as the material tends to follow the line of the inclined baffles I4. This will tend to increase the number of surfaces presented for irradiation, thereby making a more thoroughly activated product.

The apparatus herein described is particularly well adapted for the irradiation of milk. This statement, however, is not to be understood as a limitation, as I am well aware that the apparatus can be used in connection with a great variety of liquids or to solids in a granular or pulverulent form.

I claim:

1. An irradiating device comprising, in combination, means forming a supporting surface for a substance to be irradiated, a source of energy so placed that the radiant energy will impinge on a substance flowing on said surface, and a plurality of baffles on said surface, said baffles being spaced at varying distances from each other and being closer together toward the exit from than toward the entrance to said surface.

2. An apparatus for irradiating liquid or granular material, such apparatus comprising, in combination, means providing a non-horizontal surface to support a body of such material adapted to flow downwardly along said surface by gravity; a source of radiant energy constructed and arranged to impinge an irradiating medium against material flowing downwardly along said surface; and spaced baffles extending across the path of such flowing material, the baffles nearer the lower end of said surface being closer together than those nearer the upper end of said surface.

3. An apparatus for irradiating liquid or granular material, such apparatus comprising, in combination, means providing a supporting surface for a flowing body of such material; a source of energy constructed and arranged to impinge an irradiating medium against material flowing along said surface; and spaced baffles extending across the path of such flowing material and inclined relatively to the general direction of flow of the material along said surface, alternate baffles being inclined in opposite directions.

4. An irradiating device comprising a source of radiant energy, a casing surrounding said source, the inner surface of said casing forming means for conducting material to be irradiated through the path of said radiant energy and a plurality of baffles extending around the inner surface of said casing, said baffles being inclined, alternate baffles being inclined in opposite directions.

5. Process of treating liquid or granular material which comprises flowing a thin film or layer of such material along a surface, intermittently retarding the flow to rotate the particles of material about axes at substantial angles to each other to expose substantially all particles during their flow, and subjecting the material to radiant energy while it is in motion.

6. Process of treating a material which will flow under the influence of gravity which comprises flowing such material in a thin layer along a surface under the influence of gravity, intermittently retarding said flow by baffles to rotate the particles of material about axes at substantial angles to each other to expose substantially all the particles of said material during the flow, and subjecting the material to radiant energy while it is in motion.

7. Process of treating liquid which comprises causing said liquid to flow downwardly in a thin sheet under the influence of gravity, intermittently retarding the flow of said sheet and concomitantly causing the particles of said sheet to rotate about axes at substantial angles to each other, and subjecting said particles to radiant energy while they are in motion.

WALTER BAECKLER.